United States Patent
Tsirkin et al.

(10) Patent No.: US 11,614,956 B2
(45) Date of Patent: Mar. 28, 2023

(54) MULTICAST LIVE MIGRATION FOR ENCRYPTED VIRTUAL MACHINES

(71) Applicant: RED HAT, INC., Raleigh, NC (US)

(72) Inventors: Michael Tsirkin, Lexington, MA (US); Andrea Arcangeli, Imola (IT)

(73) Assignee: Red Hat, Inc., Raleigh, NC (US)

( * ) Notice: Subject to any disclaimer, the term of this patent is extended or adjusted under 35 U.S.C. 154(b) by 449 days.

(21) Appl. No.: 16/705,929

(22) Filed: Dec. 6, 2019

(65) Prior Publication Data

US 2021/0173685 A1 Jun. 10, 2021

(51) Int. Cl.
| | | |
|---|---|---|
| G06F 9/455 | (2018.01) | |
| H04L 9/08 | (2006.01) | |
| G06F 21/60 | (2013.01) | |

(52) U.S. Cl.
CPC ........ *G06F 9/45558* (2013.01); *G06F 21/602* (2013.01); *H04L 9/0819* (2013.01); *G06F 2009/4557* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | |
|---|---|---|
| 5,860,094 A | 1/1999 | Junya |
| 6,789,156 B1 | 9/2004 | Waldspurger |
| 7,484,073 B2 | 1/2009 | Cohen et al. |
| 7,484,208 B1 | 1/2009 | Nelson |
| 7,620,766 B1 | 11/2009 | Waldspurger |
| 8,165,221 B2 | 4/2012 | Zheng et al. |
| 8,495,318 B2 | 7/2013 | Tremaine et al. |
| 8,607,013 B2 | 12/2013 | Chen et al. |
| 8,621,112 B2 | 12/2013 | Coneski et al. |
| 8,627,112 B2 | 1/2014 | Chaturvedi et al. |
| 8,713,328 B2 | 4/2014 | Ikeuchi et al. |
| 8,719,545 B2 | 5/2014 | Pandey et al. |
| 8,776,059 B2 | 7/2014 | Reumann et al. |
| 8,832,390 B1 | 9/2014 | Ahmad et al. |

(Continued)

FOREIGN PATENT DOCUMENTS

| | | |
|---|---|---|
| EP | 2577543 B1 | 2/2019 |
| WO | 2011078861 A1 | 6/2011 |

OTHER PUBLICATIONS

Praveen, A. et al. (2017). "Building Secretkey Based Virtual Machines in Cloud Computing to avoid Vulnerabilities in Hypervisors". International Journal of Applied Engineering Research ISSN 0973-4562 vol. 12, No. 13 pp. 4035-4043.

(Continued)

*Primary Examiner* — William J. Goodchild
(74) *Attorney, Agent, or Firm* — Lowenstein Sandler LLP

(57) ABSTRACT

A method includes receiving a request to migrate a virtual machine executing on a source host computer system to a first destination host computer system. The method further includes receiving, from the virtual machine executing on the source host computer system, an encryption key specific to the virtual machine. One or more memory pages associated with the virtual machine are encrypted using the encryption key specific to the virtual machine. The method further includes causing the one or more memory pages associated with the virtual machine to be copied to the first destination host computer system.

17 Claims, 6 Drawing Sheets

(56) References Cited

U.S. PATENT DOCUMENTS

| | | |
|---|---|---|
| 9,021,476 B1 | 4/2015 | Pratt |
| 9,042,386 B2 | 5/2015 | Lynar et al. |
| 9,069,477 B1 | 6/2015 | Overton |
| 9,116,849 B2 | 8/2015 | Nayshtut et al. |
| 9,170,950 B2 | 10/2015 | Dube et al. |
| 9,361,145 B1 | 6/2016 | Wilson et al. |
| 9,389,898 B2 | 7/2016 | Barak et al. |
| 9,536,111 B2 | 1/2017 | Sibert |
| 9,563,569 B2 | 2/2017 | Tsirkin |
| 9,578,017 B2 | 2/2017 | Ferguson et al. |
| 9,720,717 B2 | 8/2017 | Carson et al. |
| 9,720,723 B2 | 8/2017 | Bacher et al. |
| 9,729,524 B1 | 8/2017 | Brandwine et al. |
| 9,773,118 B1 | 9/2017 | Bennett et al. |
| 9,940,377 B1 | 4/2018 | Sait |
| 10,148,450 B2 | 12/2018 | Johnsen et al. |
| 10,379,764 B2 | 8/2019 | Tsirkin et al. |
| 10,572,271 B1 | 2/2020 | Tsirkin et al. |
| 10,866,814 B2 | 12/2020 | Tsirkin et al. |
| 11,302,020 B2 | 4/2022 | Matsuo et al. |
| 2008/0072072 A1 | 3/2008 | Muraki et al. |
| 2009/0132804 A1 | 5/2009 | Paul et al. |
| 2009/0276771 A1 | 11/2009 | Nickolov et al. |
| 2009/0282266 A1* | 11/2009 | Fries ................... G06F 21/602 713/193 |
| 2010/0095046 A1 | 4/2010 | Reid et al. |
| 2010/0250502 A1 | 9/2010 | Saigo |
| 2011/0010515 A1 | 1/2011 | Ranade |
| 2011/0302577 A1 | 12/2011 | Reuther et al. |
| 2012/0030406 A1 | 2/2012 | Chang et al. |
| 2012/0102258 A1 | 4/2012 | Hepkin et al. |
| 2012/0110328 A1 | 5/2012 | Pate et al. |
| 2012/0144209 A1 | 6/2012 | Kahler et al. |
| 2012/0216052 A1 | 8/2012 | Dunn |
| 2012/0311327 A1 | 12/2012 | Liu et al. |
| 2012/0324239 A1 | 12/2012 | Falk et al. |
| 2013/0097296 A1 | 4/2013 | Gehrmann et al. |
| 2013/0114812 A1 | 5/2013 | Gidwani |
| 2013/0145177 A1 | 6/2013 | Cordella et al. |
| 2014/0157005 A1 | 6/2014 | Leventhal et al. |
| 2014/0208111 A1 | 7/2014 | Brandwine et al. |
| 2014/0258655 A1 | 9/2014 | Park et al. |
| 2014/0337637 A1 | 11/2014 | Kiperberg et al. |
| 2015/0046927 A1 | 2/2015 | Rodbro et al. |
| 2015/0100791 A1 | 4/2015 | Chen et al. |
| 2015/0149999 A1 | 5/2015 | Ramanathan et al. |
| 2015/0193248 A1 | 7/2015 | Noel et al. |
| 2015/0241259 A1 | 8/2015 | Tsai et al. |
| 2015/0242159 A1 | 8/2015 | Tsirkin |
| 2015/0248357 A1 | 9/2015 | Kaplan et al. |
| 2015/0318986 A1 | 11/2015 | Novak et al. |
| 2015/0381589 A1 | 12/2015 | Tarasuk-Levin et al. |
| 2016/0026489 A1 | 1/2016 | Maislos et al. |
| 2016/0034296 A1 | 2/2016 | Kedem et al. |
| 2016/0092678 A1 | 3/2016 | Probert et al. |
| 2016/0092702 A1 | 3/2016 | Durham et al. |
| 2016/0132443 A1 | 5/2016 | Davda et al. |
| 2016/0266923 A1 | 9/2016 | Miyoshi |
| 2016/0299712 A1 | 10/2016 | Kishan et al. |
| 2016/0342462 A1 | 11/2016 | Karamanolis et al. |
| 2016/0378522 A1 | 12/2016 | Kaplan et al. |
| 2016/0378688 A1 | 12/2016 | Rozas et al. |
| 2017/0003882 A1 | 1/2017 | Bartik et al. |
| 2017/0032119 A1 | 2/2017 | Dore et al. |
| 2017/0177441 A1 | 6/2017 | Chow |
| 2017/0177862 A1 | 6/2017 | Narendra Trivedi et al. |
| 2017/0206175 A1 | 7/2017 | Sliwa et al. |
| 2017/0262204 A1 | 9/2017 | Dornemann et al. |
| 2017/0277898 A1* | 9/2017 | Powell ................... G06F 21/53 |
| 2017/0299712 A1 | 10/2017 | Scott et al. |
| 2017/0357592 A1 | 12/2017 | Tarasuk-Levin et al. |
| 2017/0364707 A1 | 12/2017 | Lal et al. |
| 2018/0011802 A1 | 1/2018 | Ndu et al. |
| 2018/0032447 A1 | 2/2018 | Kaplan et al. |
| 2018/0060237 A1 | 3/2018 | Leslie-Hurd et al. |
| 2018/0089468 A1 | 3/2018 | Rozas et al. |
| 2018/0107605 A1 | 4/2018 | Dong et al. |
| 2018/0183580 A1* | 6/2018 | Scarlata ................... G06F 21/53 |
| 2018/0189193 A1 | 7/2018 | Bernat et al. |
| 2018/0191491 A1 | 7/2018 | Chhabra et al. |
| 2018/0247082 A1 | 8/2018 | Durham et al. |
| 2018/0307435 A1 | 10/2018 | van Riel et al. |
| 2019/0057222 A1 | 2/2019 | Bradley |

OTHER PUBLICATIONS

Morbitzer, M. et al. (Jan. 7, 2019). "Extracting Secrets from Encrypted Virtual Machines". Fraunhofer AISEC Garching, 10 pages.

Mashtizadeh, et al., "XvMotion: Unified Virtual Machine Migration over Long Distance", Stanford University; VMware, Inc., Jun. 19-20, 2014, 13 pages.

"Secure Encrypted Virtualization Key Management", Advanced Micro Devices, Aug. 2016, 68 pages.

Kaplan, et al., "AMD Memory Encryption", Advanced Micro Devices, Inc., Apr. 21, 2016, 12 pages.

Divyambika, et al., "Protection of Virtual Machines during Live Migration in Cloud Environment", School of Computing, SASTRA University, Thanjavur-613401, Tamil Nadu, India, May 2015, http://www.indjst.org/index.php/ndjst/article/viewFile/65589/55379, 7 pages.

Aiash, et al., "Secure Live Virtual Machines Migration: Issues and Solutions", School of Science and Technology Middlesex University, UK, May 2014, https://www.researchgate.net/publication/26076307 4 Secure_ Live_ Virtual_ Machines_ Migration Issues_ and_ Solutions, 10 pages.

Steele, "Virtual Machine Migration FAQ: Live Migration, P2V and More", Aug. 2010, http://searchservervirtualization.techtarget.com/featureNirtual-machine-migration-FAQ-Live-migration-P2V-and-more, 4 pages.

Resma, et al., "A Hybrid Cloud Approach for Secure Authorized Deduplication", http:1/dsresearchcenter.neUPDF/V2_I15N2-I15-17.pdf, Sep. 2016; 8 pages.

Nirmalrani Vet al., "Efficient Method for Cloud Storage Based on Proof of Ownership", http://www.ijptonline.com/wpoontenUuploads/2016/07/3815-3822.pdf, Jun. 2016; 8 pages.

Tang, et al., "Enabling Ciphertext Deduplication for Secure Cloud Storage and Access Control", http://dl.acm.org/citation.cfm?id=2897846, May 30-Jun. 3, 2016, 2 pages.

Jo, Changyeon et al., "Efficient Live Migration of Virtual Machines Using Shared Storage", 2013, pp. 1-10.

Gebhardt et al; "Secure Virtual Disk Images for Grid Computing", 2008, IEEE, pp. 19-29. (Year: 2008).

USPTO, Office Action for U.S. Appl. No. 15/592,954, dated Dec. 13, 2018.

USPTO, Notice of Allowance for U.S. Appl. No. 15/592,954, dated Apr. 2, 2019.

Secure Encrypted Virtualization Key Management, Advanced Micro Devices, publication No. 55766, Aug. 2016, 68 pages.

Aslam et al., "Security and Trust Preserving VM Migrations in Public Clouds," 2012 IEEE 11th International Conference on Trust, Security and Privacy in Computing and Communications Year: 2012 | Conference Paper | Publisher: IEEE.

Osanaiye et al., "From Cloud to Fog Computing: A Review and a Conceptual Live VM Migration Framework," IEEE Access Year: 20171 vol. 51 Journal Article | Publisher: IEEE.

\* cited by examiner

MULTICAST LIVE MIGRATION FOR ENCRYPTED VIRTUAL MACHINES

TECHNICAL FIELD

Embodiments of the present disclosure relate to virtualization systems, and more specifically, relate to multicast live migration for virtual machines.

BACKGROUND

A virtual machine (VM) is a portion of software that, when executed on hardware of a host computer system creates an environment allowing for an abstraction of some physical components of the host computer system in order to allow running of various modules, for example, multiple operating systems, concurrently and in isolation from other modules. Virtualization permits, for example, consolidating multiple physical servers into one physical server running multiple VMs in order to enhance the hardware utilization rate. The host allocates a certain amount of its resources to each VM. Each VM can then use the allocated resources to execute applications, including operating systems (guest operating systems (OS)). A software layer providing the virtualization may be referred to as a hypervisor, a virtual machine monitor (VMM), or a kernel-based hypervisor, to name a few examples. The hypervisor emulates the underlying hardware of the host computer system, making the use of the VM transparent to the guest OS and the user of the VM. A VM may have a virtual processor, virtual system memory, virtual storage, and various virtual devices.

BRIEF DESCRIPTION OF THE DRAWINGS

The disclosure is illustrated by way of example, and not by way of limitation, and may be more fully understood with references to the following detailed description when considered in connection with the figures, in which.

DETAILED DESCRIPTION

Figure 1:
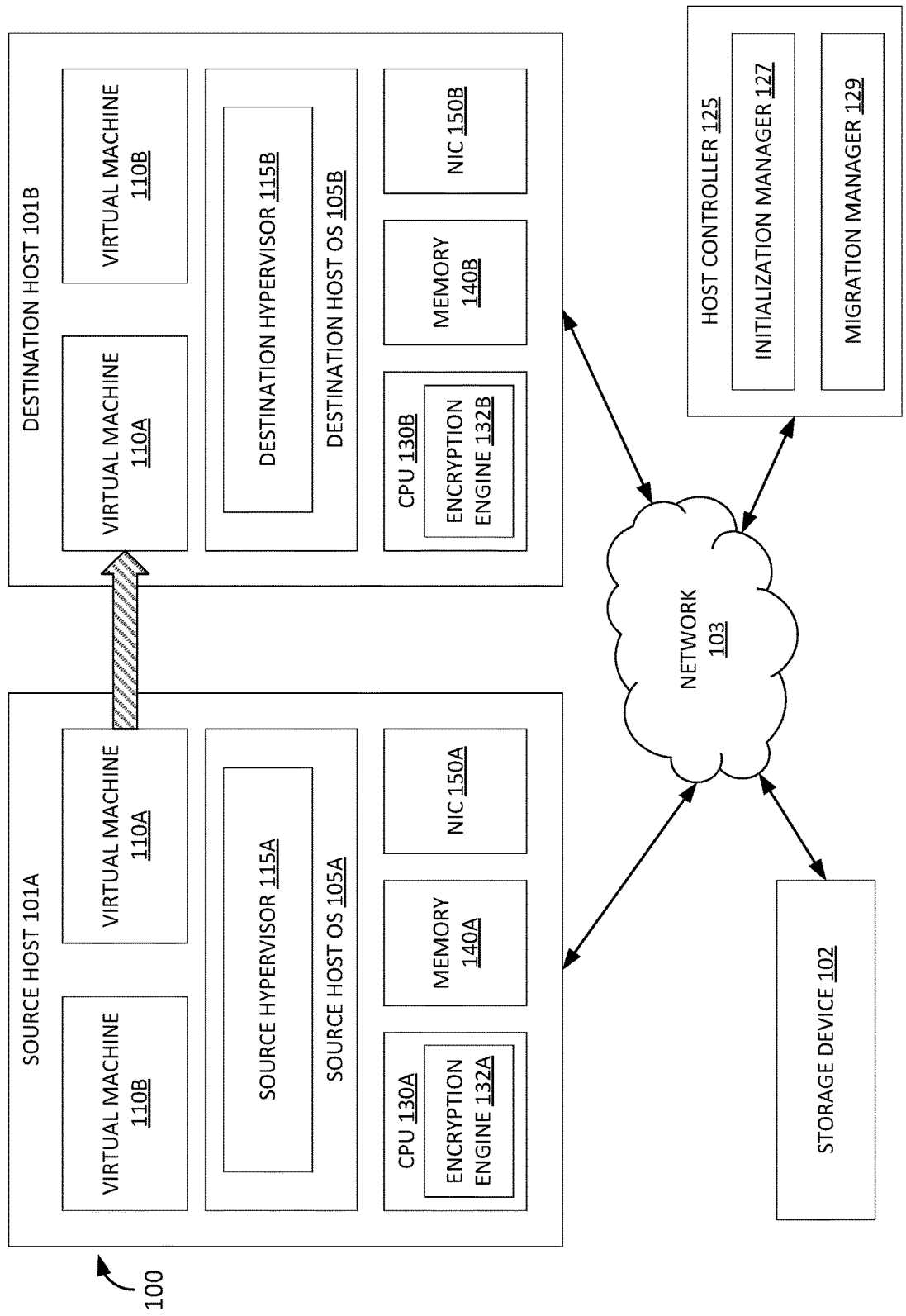
FIG. 1 illustrates a virtualization system in which implementations of the present disclosure may operate.

Described herein are methods and systems for multicast live migration of encrypted virtual machines (VMs). VM migration refers to the process of stopping execution of a VM at the source host computer system, transferring the state of the VM to a destination computer system, and resuming execution of the VM at the destination computer system. One approach for migration of a VM from a source host computer system to a destination host computer system over a network is to permit a VM running on the source host to continue to run as a portion of the VM state is transferred from the source host computer system to the destination host computer system, which is referred to as live migration. Live migration typically permits a running VM to be moved between different physical machines transparently for application programs running on the VM and for their respective clients. For successful live migration, VM memory and network addresses should be migrated from the source host to the destination host. Multicast addressing (also referred to as multicasting) typically refers to the delivery of information to a group of destinations simultaneously using the most efficient strategy to deliver the information over the network only once. With respect to live migration of virtual machines, multicasting may refer to migrating a virtual machine executing on a source host machine to a group of multiple destination hosts simultaneously or sequentially over a network.

Encrypted virtualization provides a security paradigm that protects VMs from physical threats, including other VMs and/or a hypervisor that manages the VMs. In some implementations, encrypted VMs may be implemented using a Secure Encrypted Virtualization (SEV) feature set provided by AMD®. In other implementations, encrypted VMs may be implemented by other processor architectures that implement isolation between the encrypted VM and the hypervisor managing the encrypted VM. When encrypted virtualization is enabled, an encryption engine (e.g., firmware, circuitry of a processing device, etc.) of the host may encrypt each memory page of a VM running on the host computer system with an encryption key that is derived from the memory address of the memory page being encrypted. Because a portion of memory of the destination host computer system would likely not be associated the same memory address as the memory address used to derive the encryption key, migration of an encrypted VM while preserving the memory address may not be practical.

In some implementations, a public/private key pair may be utilized to securely migrate the VM. In such implementations, an encryption key is derived from the memory address of one or more portions of VM memory on the source host computer, referred to as a source private key. This encryption key is held by the source host central processing unit (CPU) and is inaccessible to the hypervisor. During initialization of the VM, the one or more portions of VM memory may be encrypted using the source private key. In response to receiving a request to migrate the VM from the source host computer system to the destination host computer system, the source host computer system receives a public key associated with the destination host, referred to as the destination public key. In response to validating the destination public key, the one or more portions of VM memory are decrypted using the source private key and re-encrypted using the destination public key. The VM is then migrated from the source host to the destination host. In response to receiving the VM at the destination host, the VM memory is stored in memory on the destination host. The VM memory is decrypted using a private key associated with the destination host. In response to decrypting the VM memory using the private key associated with the destination host, the VM memory is re-encrypted using an encryption key that includes the memory address of one or more portions of VM memory on the destination host. The encrypted VM may then be executed on the destination host while being protected from physical threats, including other VMs executing on the destination host or the hypervisor that manages the VMs executing on the destination host.

However, the above-described migration scheme utilizes destination-specific encryption keys, thus requiring that the destination host be known before the migration, which effectively excludes multicast migration and snapshot migration of VMs.

Implementations of the disclosure address the above-mentioned and other deficiencies by utilizing, for migrating a VM from the source hos to the destination host, a VM-specific encryption key, which is directly (i.e., bypassing the hypervisor) communicated to the host CPU by the VM. Thus, prior to migration, the host CPU may decrypt the VM memory pages using the source host-specific encryption key and re-encrypt memory pages using the encryption key supplied by the VM. The encrypted memory pages may then be copied to the destination host during live migration. Injection of the VM-originated encryption key into the host CPU may be performed by executing architecture-dependent instructions (e.g., storing the key). The CPU of the destination host computer system may decrypt the received memory pages using the VM-specific encryption key and re-encrypt the memory pages using an encryption key specific to the destination computer system, after which the VM may be resumed on the destination host. Because a VM-specific encryption key, rather than a destination host-specific encryption key, is used for encrypting the VM memory pages of the source host computer system, the memory pages may be copied to multiple destination host computer systems simultaneously or sequentially.

FIG. 1 illustrates a virtualization system 100 in which embodiments of the present disclosure may operate. It should be noted that other architectures for virtualization system 100 are possible, and that the implementation of a virtualization system utilizing embodiments of the disclosure are not necessarily limited to the specific architecture depicted by FIG. 1.

The virtualization system 100 may include a source host computer system 101a (the "source host 101a"), a destination host computer system 101b (the "destination host 101b"), one or more storage devices 102, and a host controller 125, which may all be communicably connected over a network 103. Each of hosts 101a and 101b may be computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to implement key management for encrypted virtual machines in accordance with the present disclosure.

The network 103 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, hosts 101a and 101b may belong to a cluster comprising additional computer systems not depicted in FIG. 1, while in some other implementations, hosts 101a and 101b may be independent systems that are capable of communicating via network 103.

The source host 101a and the destination host 101b may include hardware components, such as one or more physical central processing units (CPUs) 130a-130b, memory 140a-140b, network interface cards (NICs) 150a-150b, and other hardware components. One or more processors may be embodied as CPU 130a-130b, which may be and/or include a microprocessor, digital signal processor (DSP), or other processing component. CPU 130a-130b may process various received data and may carry out the code or instructions or one or more computer programs, for example, to provide input/output operations specified by the instructions.

Memory 140a-140b may include volatile memory devices (e.g., random access memory (RAM)), non-volatile memory devices (e.g., flash memory), and/or other types of memory devices), and a storage device (e.g., a magnetic hard disk, a Universal Serial Bus (USB) solid state drive, a Redundant Array of Independent Disks (RAID) system, a network attached storage (NAS) array, etc.). It should be noted that the fact that a single CPU 130a, 130b is depicted in FIG. 1 for each of hosts 101a and 101b is merely illustrative, and that in some other examples one or both of hosts 101a and 101b may comprise a plurality of CPUs. Similarly, in some other examples one or both of hosts 101a and 101b may comprise a plurality of storage devices, rather than a single storage device.

Source host 101a and destination host 101b may each host one or more virtual machines (VMs) (such as VM 110a, 110b, 110c). Source host 101a may execute an operating system 105a ("source host OS") to manage its resources. Similarly, destination host 101b may execute an operating system 105b ("destination host OS") to manage its resources. Each VM may execute a guest OS (not shown). Source host 101a may also execute a source hypervisor 115a to virtualize access to underlying source host hardware, making the use of VMs running on source host 101a transparent to the guest OS running on the VMs and users (e.g., a system administrator) of the source host 101a. Destination host 101b may execute the destination hypervisor 115b to virtualize access to underlying source host hardware, making the use of the VMs running on destination host 101b transparent to the guest OS running on the and users (e.g., a system administrator) of the destination host 101a.

In one implementation, source host 101a and destination host 101b may reside in different clouds, such as a first cloud and a second cloud, respectively. In some embodiments, the first cloud may be a private cloud. The second cloud may be a public cloud or a hybrid cloud. The public cloud may be a cloud service that is accessible to the public, such as Amazon's Elastic Compute Cloud™ (ECC), Microsoft's Azure™ service, or Google's Compute Engine™, or other similar cloud service. The private cloud may be similar to a public cloud but may be operated for a single organization and may be hosted and or managed by the organization or by a third-party. The hybrid cloud may be a cloud computing service that is composed of a combination of private, public and community cloud services, from different service providers. In another implementation, source host 101a may not reside in a cloud and may be implemented by a computing device, such as a computing device described in connection with FIG. 6.

CPU 130a, 130b may include an encryption engine 132a, 132b that provides an encrypted virtualization mechanism to encrypt VMs 110a, 110b, 110c to protect VM 110a, 110b, 110c from physical threats, as well as from other VMs and hypervisor 115a, 115b. In one embodiment, encryption engine 132a, 132b may be implemented as hardware circuitry of CPU 130a, 130b. In some implementations, encryption engine 132a, 132b may be provided as firmware installed on host 101a, 101b. The encryption engine 132a, 132b may implement a Secure Encrypted Virtualization (SEV) feature set provided by AMD®. A VM protected by the encrypted virtualization mechanism is also referred to herein as an "encrypted virtual machine" or "encrypted VM."

When encrypted virtualization is enabled, the encryption engine 132a, 132b may tag code and data associated with a VM with a VM identifier (ID). For example, code and data associated with VM 110A may be tagged by encryption engine 132a with a VM ID indicating that the code and data is associated with VM 110A. This tag is kept with the data and indicates that data is not to be used and/or accessed by any component (e.g., another VM, a hypervisor, etc.) other than the VM associated with the data. In some implementations, the memory pages of the VM may be encrypted with an encryption key that is derived from the host address of the memory page being encrypted (e.g., by applying a predetermined transformation to the host address or by including at least part of the host address into the key). The host-specific encryption key is not accessible to any applications running on the host, including the hypervisor managing the encrypted VM or any other VM.

The host-specific encryption key may be maintained by the encryption engine 132a. A memory page associated with an encrypted VM may be decrypted by the encryption engine 132a in response to a request to access the memory page. As such, the encryption engine 132a, 132b may provide cryptographic isolation between VMs, as well as between the VMs and a hypervisor 115a, 115b managing the VMs. In some embodiments, hosts 101a, 101b may host one or more encrypted VMs and/or one or more unencrypted VMs. For example, source host 101a may host an encrypted VM 110a and one or more unencrypted VMs 110b. In another example, each of the VMs hosted by source host 101a may be an encrypted VM. Each of host 101a, 101b may host any suitable number of encrypted VMs and/or unencrypted VMs. In some embodiments, hosts 101a and/or 101b may implement encrypted virtualization as described in connection with FIG. 2.

Virtualization system 100 may also include a host controller 125. Host controller 125 may reside on a designated computer system (e.g., a server computer, a desktop computer, etc.) or be part of hosts 101a, 101b or another machine. Host controller may include an initialization manager 127 and a migration manager 129. Initialization manager 127 may manage VM initialization by issuing instructions to source host 101a and destination host 101b. For example, initialization manager 127 may initialize VM 110a on source host 101a by transmitting a request to source host 101a to initialize VM 110a. In some embodiments, source host 101a may respond to the request by transmitting a notification indicating a VM ID for VM 110a. In other embodiments, the request to source host 101a to initialize VM 110a may include a VM ID to be associated with VM 110a. Initialization manager 127 may generate a VM-specific encryption key associated with VM 110a. In some embodiments, the VM-specific encryption key may be derived from a feature that is specific to VM 110a. For example, the VM-specific encryption key may be derived from the VM ID for VM 110a. Initialization manager 127 may inject the VM-specific encryption key into VM 110a. In other or similar embodiments, initialization manager 127 may generate and inject the VM specific key into VM 110a at any point in time prior to migration of VM 110a from source host 101a to destination host 101b. In other or similar embodiments, in response to receiving a request to initialize VM 110a on source host 101a, the guest OS operating on VM 110a may generate the VM-specific key, which may be maintained by VM 110a while VM 110a is running. The guest OS operating on VM 110a may generate the VM-specific key at any point in time prior to the migration of VM 110a from source host 101a to destination host 101b. The VM-specific encryption key is not accessible by hypervisor 115a managing VM 110a.

During initialization of VM 110a, one or more memory pages associated with VM 110a may be encrypted using a host-specific encryption key, in accordance with previously disclosed embodiments. As VM 110a is running on source host 101a, a memory page associated with VM 110a may be decrypted using the source host-specific encryption key in response to a request to access the memory page. The source host-specific encryption key may not be accessible and/or known to hypervisor 115a.

In some implementations, virtualization system 100 of FIG. 1 may perform a migration process to migrate a VM from source host 101a to destination host 101b. For example, as illustrated in FIG. 1, VM 110a may be migrated from the source host 101a to the destination host 101b. For a successful live migration, memory 140a and network connectivity of VM 110a may be migrated from source host 101a to destination host 101b. Multicast live migration refers to migrating VM 110a running on source host 101a to multiple destination hosts, including destination host 101b, simultaneously or sequentially over a network. Further details regarding multicasting are provided with respect to FIG. 4.

In one embodiment, hypervisors 115a and/or 115b may receive migration commands from host controller 125. As discussed previously, host controller 125 may include migration manager 127 that may manage VM migration by issuing instructions to hypervisors 115a and/or 115b. Migration manger 127 may issue the migration instructions after a triggering event (e.g., a request for migration received from a system administrator, a change in system conditions, such as resource utilization by source host exceeding a threshold, etc.). Source hypervisor 115a may initiate live migration response to receiving a request from migration manager 127 of host controller 125 to migrate VM 110a from source host 101a to at least one destination host 101b. Destination hypervisor 115b may similarly receive a request from migration manager 127 of host controller 125 to accept VM 110a from source host 101a. In response to receiving a request to accept VM 110a from source host 101a, destination hypervisor 115b may transmit a notification to migration manager 127 indicating an acceptance to receive VM 110a from source host 101a at destination host 101b.

In response to receiving a request to migrate VM 110a from source host 101a to destination host 101b, source hypervisor 115a may issue an instruction causing VM 110a to load the encryption key specific to VM 110a to encryption engine 132a. The VM-specific encryption key is directly communicated to the host CPU, and thus is never revealed to source hypervisor 115a.

In response to receiving the VM-specific encryption key, encryption engine 132a may decrypt one or more memory pages associated with VM 110a using the source host-specific encryption key. Encryption engine 132a may re-encrypt the decrypted memory pages using the VM-specific encryption key. In response to receiving a notification that the decrypted memory pages have been re-encrypted, source hypervisor 115a may cause at least the encrypted memory pages to be copied, via network 103, from memory 140a of source host 101a to memory 140b of destination host 101b.

Destination host machine 101b may receive the encryption key specific to VM 110a. In some embodiments, the VM-specific encryption key may be received from the guest OS as a part of the boot sequence of the VM on the destination host.

In response to receiving the encrypted memory pages associated with VM 110a, the encrypted memory pages may be stored in memory 140b to be associated with VM 110a. The encrypted memory pages may be decrypted by the encryption engine 132b using the VM-specific encryption key. The encryption engine 132b may generate a destination host-specific key. In some embodiments, the destination host-specific encryption key may be derived from the one or more portions of memory 140b associated with VM 110a. In response to generating the destination-host specific key, the encryption engine 132b may then re-encrypt the memory pages using the destination-host specific key. In response to the one or more memory pages of VM 110a being encrypted using the destination host-specific key, VM 110a can be resumed on destination host 101b.

Implementations of the present disclosure may apply to other or similar methods of migrating execution of a VM from source host 101a to destination host 101b. For example, in some embodiments, hypervisor 115a may cause a snapshot of VM 110a to be generated in response to a request to generate a snapshot of VM 110a. A snapshot of VM 110a may include at least part of an execution state of VM 110a (i.e., the state of the processor, memory, disks, and/or any other component of VM 110a running at the time the snapshot is generated). In some embodiments, the snapshot may be generated in response to a request from host controller 125. The snapshot may include the one or more VM memory pages that are encrypted using the VM-specific encryption key, in accordance with previously described embodiments. The snapshot may be saved to a disk file, which may be stored in storage device 102, or any available storage component associated with source host 101a, including a storage component of source host 101a (not shown).

In some embodiments, the disk file storing the snapshot of VM 110a may be transmitted to a storage component accessible by destination host 101b. The storage component associated with destination host 101b may be a storage component of destination host 101b (not shown). In response to receiving the disk file, destination hypervisor 115b may cause the snapshot to be loaded to destination host 101b. Destination hypervisor 115b may load one or more portions of VM memory that are encrypted with the VM-specific encryption into memory 140b. In response to destination hypervisor 115b loading the portions of VM-memory into memory 140b, encryption engine 132b may decrypt the portions of VM memory using the VM-specific encryption key, which may be received by destination host 101b in accordance with previously disclosed embodiments. Encryption engine 132b may cause the un-encrypted portions of VM memory to be re-encrypted using the destination host-specific encryption key, which may be generated in accordance with previously disclosed embodiments. In response to receiving a notification that the portions of VM memory have been re-encrypted using the destination host-specific encryption key, destination hypervisor 115b may initialize VM 110a to execute on destination host 101b.

Figure 2:
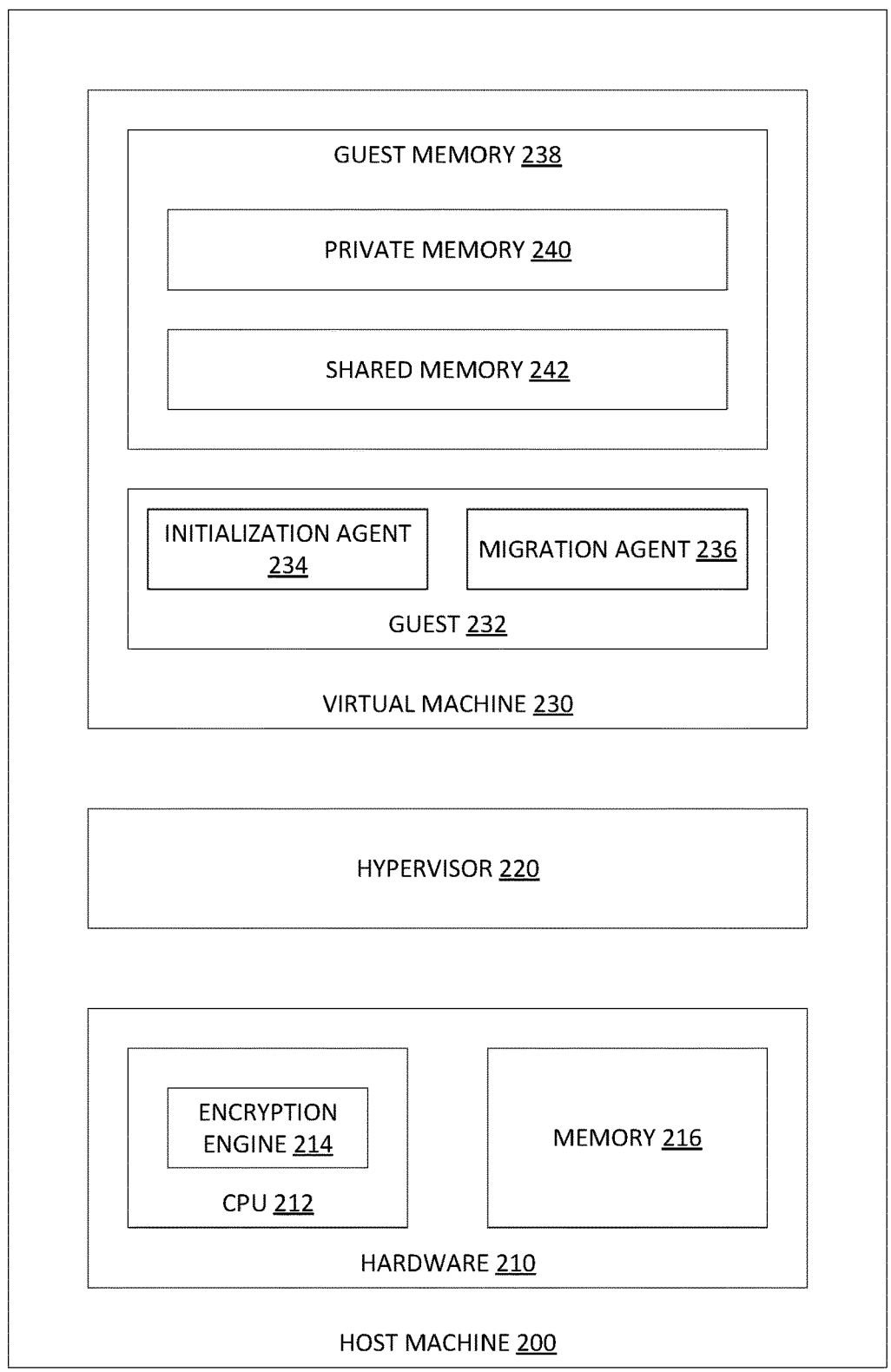
FIG. 2 illustrates an example of a host machine implementing encrypted virtualization, in accordance with implementations of the present disclosure.

FIG. 2 illustrates an example of a host machine 200 implementing encrypted virtualization, in accordance with implementations of the present disclosure. In one implementation, host machine 200 is the same as source host 101a and/or destination host 101b as described with respect to FIG. 1. As illustrated, host machine 200 may include hardware 210, a hypervisor 220, a virtual machine 230, and/or any other suitable component. Hardware 210 may include CPU 212, memory 216, one or more I/O devices (not shown), etc. CPU 212 may further include an encryption engine 214. In one implementation, hypervisor 220 is the same as source hypervisor 115a and/or destination hypervisor 115b as described with respect to FIG. 1. Encryption engine 214 may be the same as encryption engine 132a and/or encryption engine 132b as described with respect to FIG. 1. Memory 216 may be the same as memory 140a and/or memory 140b as described with respect to FIG. 1. More or fewer components than illustrated as part of host machine 200 in FIG. 2 may be implemented in host machine 200, and implementations of the disclosure are not limited to those specifically described and illustrated herein.

Hypervisor 220 may abstract components of hardware 210 (e.g., CPU 212, memory 217, I/O devices, etc.), and present this abstraction to VM 230 and one or more other virtual machines hosted by host machine 200 as virtual devices, such as virtual processors, virtual memory, virtual I/O devices, etc. Hypervisor 220 may include hypervisor memory (not shown). In some embodiments, the hypervisor memory may include private memory and shared memory. Private memory may be encrypted with an encryption key that is accessible to hypervisor but inaccessible to VM 230 or other virtual machine running on host machine 200. Shared memory may be accessible to hypervisor 220, VM 230, and/or other device that is granted access to shared memory. In some embodiments, shared memory may be encrypted with an encryption key that is accessible to hypervisor 220 and VM 230. Hypervisor 220 can use shared memory to communicate with VM 230 and/or one or more other virtual machines that have access to shared memory. For example, to transmit certain data to VM 230, hypervisor 220 can store the data in shared memory. Guest 232 can then retrieve the data from shared memory.

Virtual machine 230 can execute a guest operating system (also referred to as "guest") 232 which may utilize the underlying virtual devices, including virtual processors, virtual memory (e.g., guest memory 236), and virtual I/O devices. One or more applications and/or services may be running on VM 230 under the guest operating system. Guest 232 may execute an initialization agent 234 and a migration agent 236. In some embodiments, one or more functions performed by initialization agent 234 and/or migration agent 236 may be performed by different components, as illustrated in FIG. 2. In other or similar embodiments, one or more functions performed by initialization agent 234 and/or migration agent 236 may be performed by the same component.

Initialization agent 234 may facilitate one or more initialization operations during the initialization of VM 230. For example, during the initialization of VM 230, initialization agent 234 may receive an encryption key specific to VM 230 from an external component (e.g., host controller 125 described with respect to FIG. 1). Initialization agent 234 may cause the VM-specific encryption key to be stored in private memory 240. In other or similar embodiments, during the initialization of VM 230, initialization agent 234 may generate the VM-specific encryption key. In some embodiments, initialization agent 234 may generate the VM-specific encryption key in response to a request from an external component, such as host controller 125, to generate the VM-specific encryption key.

Migration agent 236 may facilitate one or more migration operations during the migration of VM 230 from a source host to a destination host. For example, in response to receiving a request to migrate VM 230 to a destination host machine, migration agent 236 may cause the VM-specific key to be transferred to encryption engine 214 of CPU 212. The VM-specific encryption key may be transferred to encryption engine 214 such that hypervisor 220 does not have access to the VM-specific encryption key. In some embodiments, migration agent 236 may execute one or more commands causing encryption engine 214 to encrypt one or more memory pages associated with VM 230 using the VM-specific encryption key. In accordance with previously described embodiments, migration agent 236 may cause encryption engine 214 to encrypt the memory pages in response to the memory pages being decrypted using a host-specific encryption key.

In response to VM 230 being migrated from a source host machine to a destination host machine and the memory pages associated with VM 230 being placed in a portion of memory 216 allocated for VM 230, migration agent 236 may execute one or more instructions causing encryption engine 214 to decrypt the memory pages using the VM-specific encryption key. In response to the memory pages being decrypted using the VM-specific encryption key, the memory pages may be re-encrypted using the host-specific encryption key, in accordance with previously described embodiments.

Hypervisor 220 may map a virtual resource or state (e.g., registers, memory, files, etc.) to physical resources of host machine 200. For example, hypervisor 220 can present a guest memory 238 to guest 232. Hypervisor 220 may map the memory location of guest memory 238 to physical memory locations of memory 216. Guest memory 238 may store state information of guest 232 that may be mapped to physical memory locations of memory 216.

In some embodiments, VM 230 may be an encrypted VM as described in connection with FIG. 1. As described previously, guest memory 238 may include private memory 240 that is encrypted with an encryption key. The encryption key may be a host-specific encryption key. In some embodiments, encryption engine 214 may identify a particular memory page as a page of private memory 240 (e.g., by determining that a bit of an address of the memory page (e.g., a physical address) indicates that encrypted virtualization is enabled for the memory page). Accesses to the memory page (e.g., writing to or reading from the memory page) may then be encrypted and decrypted by encryption engine 214 using the encryption key.

Guest memory 238 may also include shared memory 242. Shared memory 242 may be accessible to hypervisor 220 and/or one or more other devices that have been granted access to shared memory 240. For example, shared memory 242 may be encrypted with an encryption key that is accessible to hypervisor 220 and VM 230. The VM 230 can use shared memory 242 to communicate with hypervisor 220 and/or one or more other VMs that have access to shared memory 240. For example, to transmit certain data to hypervisor 220, guest 232 can store the data in shared memory 242. Hypervisor 220 can then retrieve the data from shared memory 242.

In some embodiments, guest 232 can designate one or more particular portions of the guest memory 238 as being protected as shared memory 242. Guest 232 can also select one or more pages of guest memory 238 as being private memory 240. In some embodiments, host machine 200 may require certain types of memory (e.g., instruction pages, page tables, etc.) to be private to protect VM 230.

Figure 3:
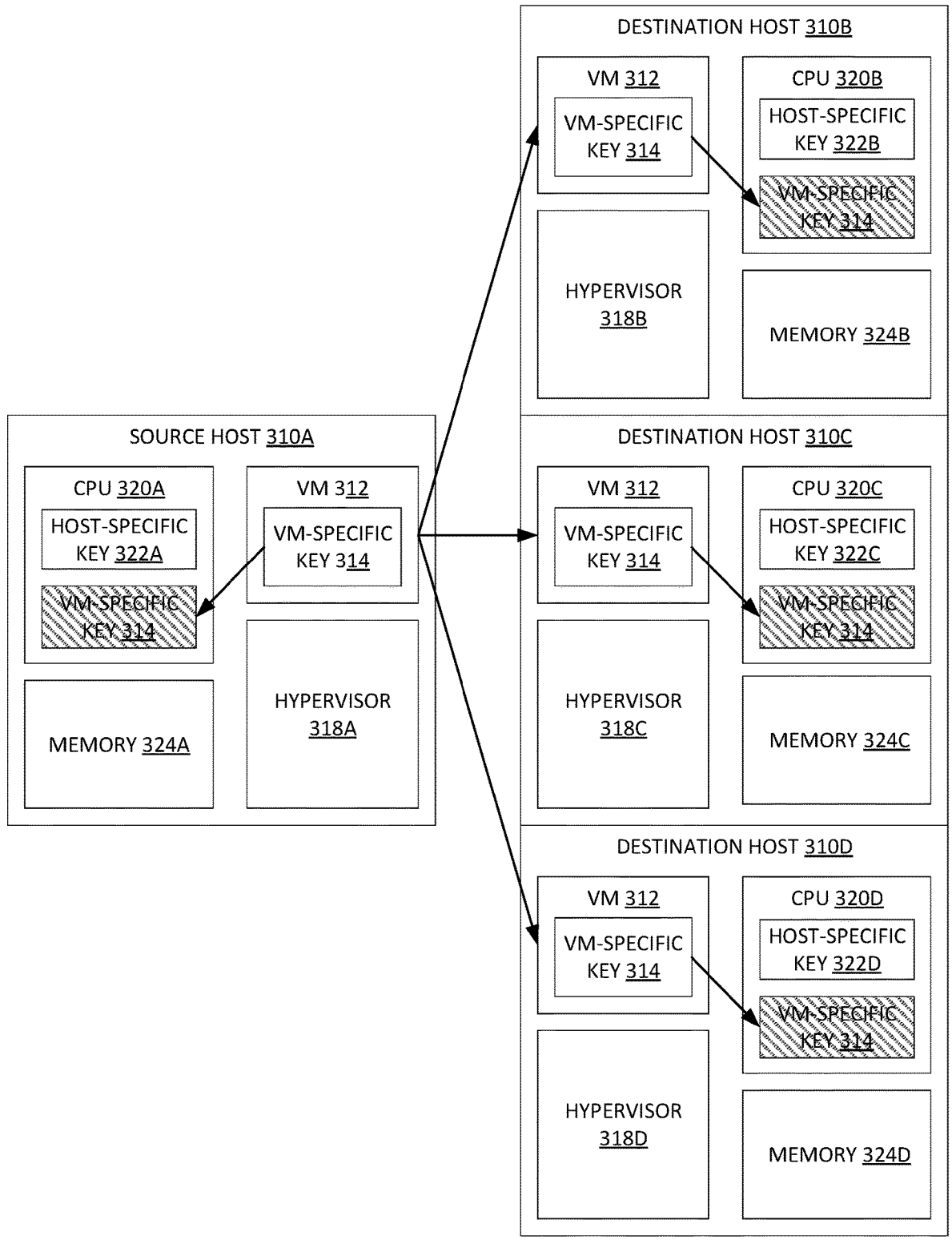
FIG. 3 is a block diagram illustrating an example of multicast live migration of an encrypted virtual machine, in accordance with implementations of the present disclosure.

FIG. 3 is a block diagram illustrating an example of multicast live migration of an encrypted virtual machine, in accordance with implementations of the present disclosure.

Multicast live migration may refer to the live migration of a VM 312 from a source host computer system 310a (referred to as source host) to multiple destination host computer systems (referred to as destination host), such as destination hosts 310b, 310c, and 310d. In some implementations, source host 310a may be the same as source host 101a, as described with respect to FIG. 1. Similarly, destination hosts 310b, 310c, and 310d may be the same as destination host 101b, as described with respect to FIG. 1.

VM 312 may be initialized on source host 310A, in accordance with previously described implementations. In some embodiments, an encryption key 314 specific to VM 312 may be injected into VM 312 during initialization of VM 312. In other or similar embodiments, VM-specific encryption key 312 may be generated by a guest operating system (also referred to as "guest") executing on VM 312 during initialization of VM 312.

In response to receiving a request to migrate VM 312 to one or more destination hosts, VM-specific encryption key 312 may be transferred from the guest to CPU 320 of source host 310a. As described previously, VM-specific encryption key 312 may be received by an encryption engine of CPU 320. CPU 320 may decrypt one or more memory pages associated with VM 312 using a host-specific key 322. CPU 320 may then re-encrypt the memory pages using VM-specific encryption key 312.

In response to the memory pages being re-encrypted using VM-specific encryption key 312, the memory pages may each be copied from memory 324a of source host 310a to memories 324b, 324c, 324d of destination hosts 310b, 310c, and 310d, respectively. Each of destination host 310b, 310c, and 310d may each receive VM-specific key 314 from an external component, such as host controller 125 of FIG. 1, or from source host 310a via a secure connection. In response to receiving VM-specific key 314, each of CPU 320b, 320c, and 320d may decrypt the received memory pages using VM-specific key 314. Each of CPU 320b, 320c, and 320d may re-encrypt the memory pages using host-specific encryption key 322b, 322c, and 322d, respectively. Hypervisors 318b, 318c, and 318d may each cause VM 312 to execute on destination 310b, 310c, and 310d, in accordance with previously described embodiments.

Implementations of the present disclosure may apply to other or similar methods of migrating execution of VM form source host 310a to destination hosts 310b, 310c, and 310d. A snapshot of VM 312 may be generated in response to a request to generate a snapshot of VM 312. The snapshot may be saved to a disk file, which may be stored in an external storage device, such as storage device 102 of FIG. 1. In other or similar embodiments, the disk file may be stored in a storage component associated with source host 310a. The disk file may be simultaneously or sequentially transmitted to a storage component associated with destination hosts 310b, 310c, and 310d. In response to receiving the disk file, destination hypervisors 318b, 318c, and 318d may cause the snapshot to be loaded to destination hosts 310b, 310c, and 310c, respectively. Destination hypervisors 318b, 318c, and 318d may load one or more portions of VM memory that are encrypted with VM-specific key 314 into memories 324b, 324c, and 324d, respectively. In response to destination hypervisors 318b, 318c, and 318d loading the one or more portions of VM memory into memories 324b, 324c, and 324d, encryption engines for each of CPUs 320b, 320c, and 320d may decrypt the one or more portions of VM memory using VM-specific key 314, in accordance with previously described embodiments. CPUs 320b, 320c, and 320d may re-encrypt the decrypted portions of VM memory using host-specific encryption keys 322*b*, 322*c*, and 322*d*, respectively. In response to receiving a notification that the portions of VM memory have been re-encrypted, destination hypervisors 318*b*, 318*c*, and 318*d* may initialize VM 312 to execute on destination hosts 310*b*, 310*c*, and 310*d*.

Figure 4:
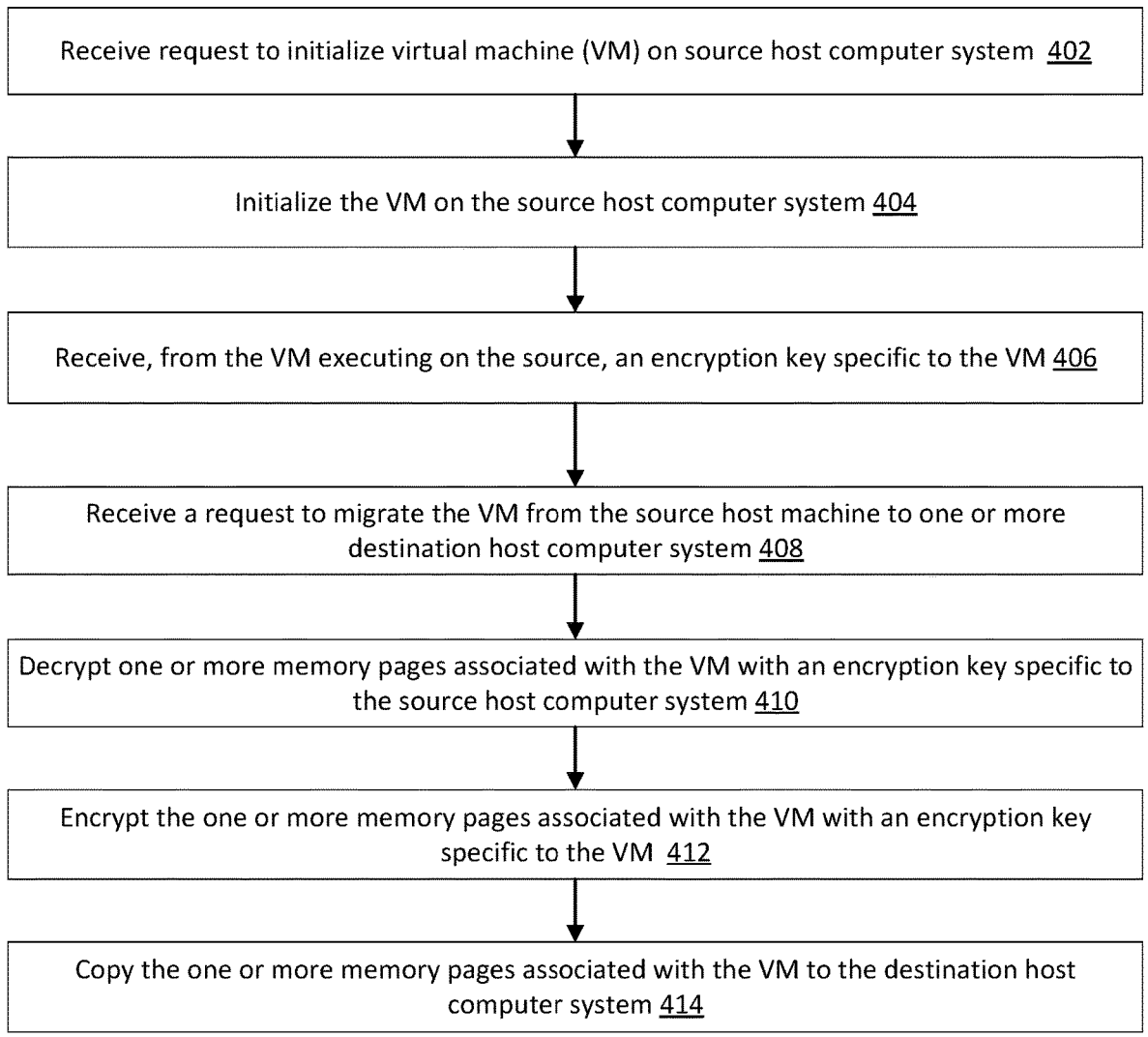
FIG. 4 is a flow diagram of a method of migrating an encrypted virtual machine from a source computer system to a destination computer system, in accordance with implementations of the present disclosure.
Figure 5:
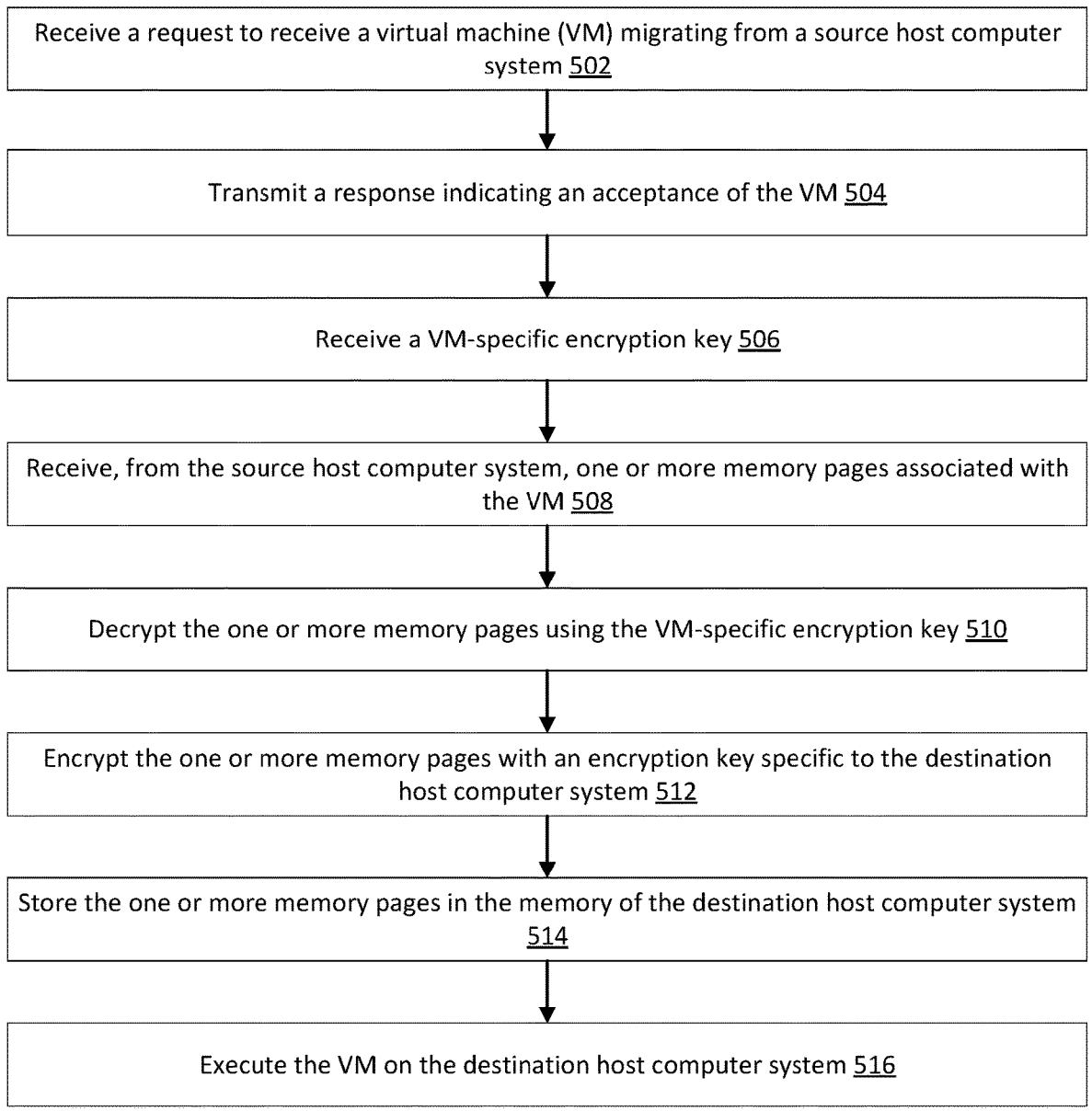
FIG. 5 is a flow diagram of another method of migrating an encrypted virtual machine from a source computer system to a destination computer system, in accordance with implementations of the present disclosure.

FIG. 4 is a flow diagram of a method 400 of migrating an encrypted virtual machine from a source computer system to a destination computer system, in accordance with implementations of the present disclosure. FIG. 5 is a flow diagram of a method 500 of migrating an encrypted virtual machine from a source computer system to a destination computer system, in accordance with implementations of the present disclosure. In one implementation, methods 400 and 500 may be performed by initialization agent 234 and migration agent 236 of guest 232, as described with respect to FIG. 2. Methods 400 and 500 may be performed by processing logic that may comprise hardware (circuitry, dedicated logic, etc.), software (e.g., software executed by a general purpose computer system or a dedicated machine), or a combination of both. Methods 400 and 500 and each of their individual functions, routines, subroutines, or operations may be performed by one or more processors of the computer device executing the method. In certain implementations, methods 400 and 500 may each be performed by a single processing thread. Alternatively, methods 400 and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In some embodiments, methods 500 and 600 may be performed by an executable code of a host machine (e.g., a host operating system or firmware), an executable code of a virtual machine (e.g., a guest operating system or virtual firmware), or any other executable code, or a combination thereof.

Referring to FIG. 4, method 400 begins at block 402 where a source host computer system receives a request to initialize a VM on the source host computer system. At block 404, the source host computer system may initialize the VM on the source host computer system. At block 406, the source host computer system may receive, from the VM executing on the source, an encryption key specific to the VM. At block 408, the source host computer system may receive a request to migrate the VM from the source host computer system to one or more destination host computer system. At block 410, the source host computer system may decrypt one or more memory pages associated with the VM with an encryption key specific to the source host computer system. At block 412, the source host computer system may encrypt the one or more memory pages associated with the VM with an encryption key specific to the VM. At block 414, the source host computer system may copy the one or more memory pages associated with the VM to the destination host computer system.

As discussed above, FIG. 5 is a flow diagram of method 500 of migrating an encrypted virtual machine from a source computer system to a destination computer system, in accordance with implementations of the present disclosure. Method 500 begins at block 502 where a destination host computer system may receive a request to receive a VM migrating from a source host computer system. At block 504, the destination host computer system may transmit a response indicating an acceptance of the VM. At block 506, the destination host computer system may receive an encryption key specific to the VM. At block 508, the destination host computer system may receive, from the source host computer system, one or more memory pages associated with the VM. At block 510, the destination host computer system may decrypt the one or more memory pages using the VM-specific encryption key. At block 512, the destination host computer system may encrypt the one or more memory pages with an encryption key specific to the destination host machine. At block 514, the destination host computer system may store the one or more memory pages in the memory of the destination host machine. At block 516, the destination host computer system may execute the VM on the destination host computer system.

Figure 6:
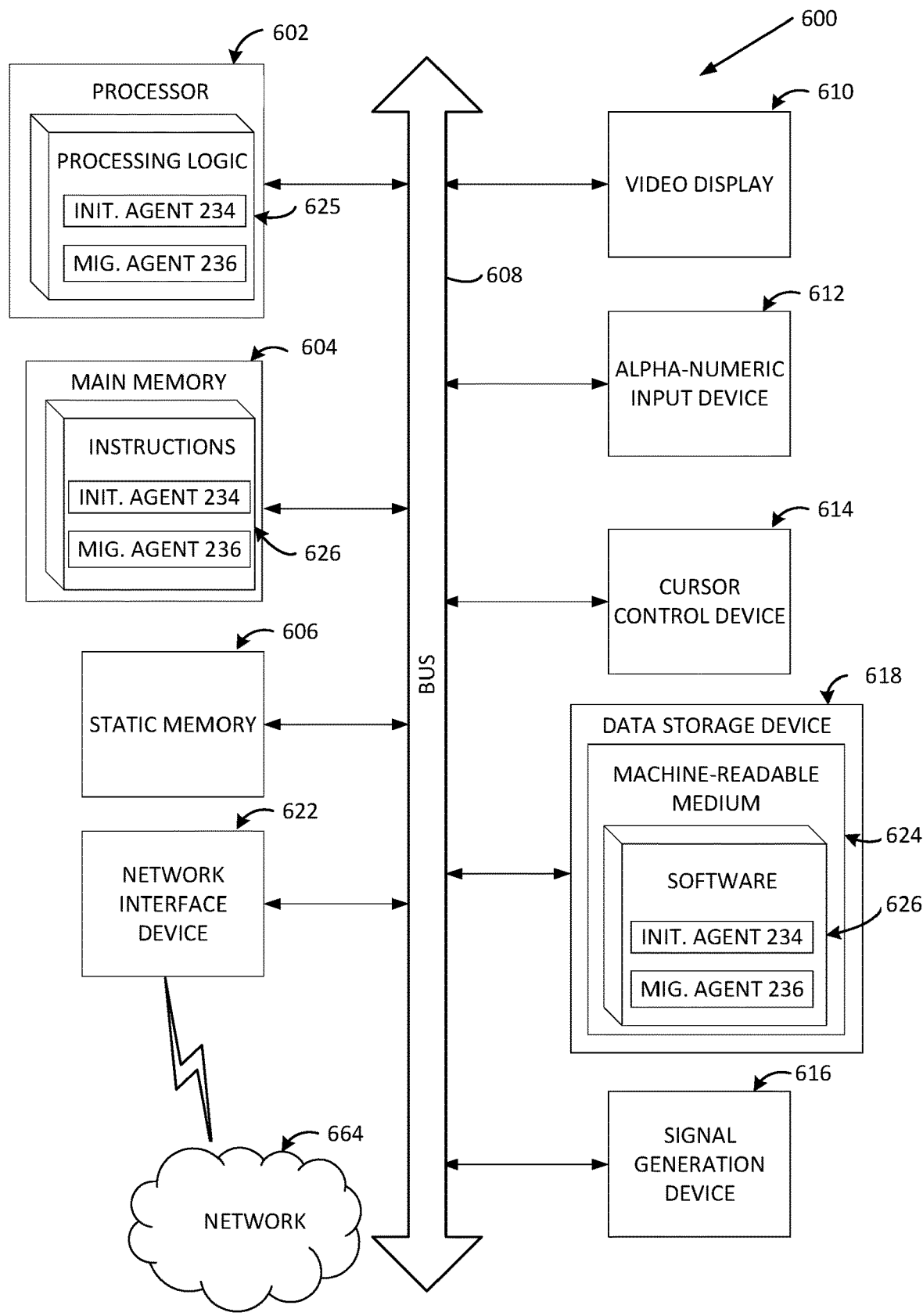
FIG. 6 is a block diagram illustrating a computer system in which implementations of the disclosure may be used.

FIG. 6 is a block diagram illustrating a computer system 600 in which implementations of the disclosure may be used. In some implementations, the computer system 600 may support multicast live migration of encrypted virtual machines and/or transfer of encrypted VM snapshots, in accordance with previously described embodiments.

The computer system 600 may be included within a data center that supports virtualization. Virtualization within a data center results in a physical system being virtualized using virtual machines to consolidate the data center infrastructure and increase operational efficiencies. A VM may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 616, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is to execute the instructions 626 for performing the operations and steps discussed herein.

The computer system 600 may further include a network interface device 622 communicably coupled to a network 625. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Instructions 626 may reside, completely or partially, within volatile memory 604 and/or within processing device 602 during execution thereof by computer system 600, hence, volatile memory 604 and processing device 602 may also constitute machine-readable storage medium 624. The instructions 626 may also implement the initialization agent 234 and migration agent 236 to support multicast live migration of encrypted VMs.

Data storage device 616 may include a computer-readable storage medium 624 (e.g., a non-transitory computer-readable storage medium) on which may store instructions 626 encoding any one or more of the methods or functions described herein, including instructions for implementing method 400 of FIG. 4 and method 500 of FIG. 5.

The non-transitory machine-readable storage medium 624 may also be used to store instructions 626 to support caching results of certain commands utilized for building multi-platform application container images described herein, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500 and 600 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
receiving, by a processing device of a source host computer system, a request to migrate a virtual machine (VM) running on the source host computer system to a first destination host computer system;
receiving, by the processing device, from the VM, an encryption key associated with the VM;
decrypting, using an encryption key associated with the source host computer system, one or more memory pages associated with the VM, wherein the encryption key associated with the source host computer system is derived from an address of a memory page of the one or more memory pages;
encrypting, using the encryption key associated with the VM, the one or more memory pages; and
causing the one or more memory pages to be copied to the first destination host computer system.

2. The method of claim 1, further comprising:
receiving a request to migrate the VM from the source host computer system to a second destination host computer system; and
causing the one or more memory pages to be copied to the second destination host computer system while the one or more memory pages are copied to the first destination host computer system.

3. The method of claim 1, wherein the encryption key is isolated from a hypervisor managing the VM on the source host computer system.

4. The method of claim 1, wherein the encryption key is derived from a feature that is specific to the VM.

5. The method of claim 1, wherein the encryption key associated with the source host computer system is derived from a memory address of the source host computer system associated with the one or more memory pages of the VM.

6. The method of claim 1, further comprising:
receiving a request to initialize the VM on the destination host computer system; and injecting, into the VM on the destination host computer system, the encryption key associated with the VM.

7. The method of claim 1, further comprising:
generating a snapshot of the VM running on the source host computer system, by storing, in a non-volatile storage, the one or more memory pages associated with the VM that are encrypted using the encryption key associated with the VM.

8. A system comprising:
a memory component; and
a processing device of a destination host computer system, the processing device to:
   detect that an encryption key associated with a virtual machine (VM) that is being migrated from a source host computer system to the destination host computer system is provided by the VM to an encryption engine running at the source host computer system;
   receive, from the source host computer system, one or more memory pages associated with a virtual machine (VM);
   decrypt, using the encryption key provided by the VM to the encryption engine, the one or more memory pages associated with the VM;
   encrypt, using an encryption key associated with the destination host computer system, the one or more memory pages associated with the VM, wherein the encryption key associated with the destination host computer system is derived from a memory address of the destination host computer system associated with the one or more memory pages of the VM;
   store the one or more memory pages at the memory component; and
   execute the VM on the destination host computer system.

9. The system of claim 8, wherein the encryption key is isolated from a hypervisor managing the VM on the destination host computer system.

10. The system of claim 8, wherein the encryption key is derived from a feature that is specific to the VM.

11. The system of claim 8, wherein the encryption key associated with the destination host computer system is a hardware-generated token.

12. The system of claim 8, wherein the processing device is further to:
receive, from the source host computer system, a snapshot of the VM executing on the source host computer system, wherein the snapshot comprises one or more memory pages associated with the VM that are encrypted using the encryption key;
decrypt the one or more memory pages using the encryption key; and
initialize the VM to execute on the destination host computer system.

13. A non-transitory computer readable storage medium including instructions that, when executed by a processing device, cause the processing device to perform a method comprising:
receiving a request to migrate a virtual machine (VM) running on a source host computer system to a first destination host computer system;
receiving, from the VM, an encryption key associated with the VM;
decrypting, using an encryption key associated with the source host computer system, one or more memory pages associated with the VM, wherein the encryption key associated with the source host computer system is derived from an address of a memory page of the one or more memory pages;
encrypting, using the encryption key associated with the VM, the one or more memory pages; and
causing the one or more memory pages to be copied to the first destination host computer system.

14. The non-transitory computer readable storage medium of claim 13, wherein the processing device is further to perform:
receiving a request to migrate the VM from the source host computer system to a second destination host computer system; and
causing the one or more memory pages to be copied to the second destination host computer system while the one or more memory pages are copied to the first destination host computer system.

15. The non-transitory computer readable storage medium of claim 13, wherein the encryption key is isolated from a hypervisor managing the VM on the source host computer system.

16. The non-transitory computer readable storage medium of claim 13, wherein the encryption key is derived from a feature that is specific to the VM.

17. The non-transitory computer readable storage medium of claim 13, further comprising:
generating a snapshot of the VM executing on the source host computer system, by
storing, in a non-volatile storage, the one or more memory pages associated with the VM that are encrypted using the encryption key associated with the VM.

* * * * *